United States Patent [19]

Reiss

[11] Patent Number: 5,114,440
[45] Date of Patent: May 19, 1992

[54] PROCESS FOR THE ADSORPTIVE OXYGEN-ENRICHMENT OF AIR WITH MIXTURES OF CA ZEOLITE A MOLECULAR SIEVES BY MEANS OF VACUUM SWING ADSORPTION

[75] Inventor: Gerhard Reiss, Leverkusen, Fed. Rep. of Germany

[73] Assignee: Bayer Aktiengesellschaft, Leverkusen, Fed. Rep. of Germany

[21] Appl. No.: 672,148

[22] Filed: Mar. 19, 1991

Related U.S. Application Data

[63] Continuation of Ser. No. 442,763, Nov. 29, 1989, abandoned.

[30] Foreign Application Priority Data

Dec. 21, 1988 [DE] Fed. Rep. of Germany ........ 3842930

[51] Int. Cl.⁵ .............................................. B01D 53/04
[52] U.S. Cl. .............................................. 55/25; 55/58; 55/68; 55/75
[58] Field of Search .............. 55/25, 26, 31, 33, 58, 55/62, 68, 75

[56] References Cited

U.S. PATENT DOCUMENTS

| | | | |
|---|---|---|---|
| 3,280,536 | 10/1966 | Berlin | 55/58 |
| 3,313,091 | 4/1967 | Berlin | 55/58 |
| 3,564,816 | 2/1971 | Batta | 55/62 X |
| 3,636,679 | 1/1972 | Batta | 55/62 X |
| 3,717,974 | 2/1973 | Batta | 55/58 |
| 3,738,087 | 6/1973 | McCombs | 55/58 |
| 3,773,690 | 11/1973 | Heinze et al. | |
| 3,788,036 | 1/1974 | Lee et al. | 55/25 |
| 3,796,022 | 3/1974 | Simonet et al. | 55/25 |
| 3,923,477 | 12/1975 | Armond et al. | 55/25 |
| 3,957,463 | 5/1976 | Drissel et al. | 55/58 X |
| 4,144,037 | 3/1979 | Armond et al. | 55/62 X |
| 4,264,340 | 4/1981 | Sircar et al. | 55/25 |
| 4,428,372 | 1/1984 | Beysel et al. | 55/25 X |
| 4,449,990 | 5/1984 | Tedford, Jr. | 55/26 |
| 4,519,813 | 5/1985 | Hagiwara et al. | 55/68 X |
| 4,539,019 | 9/1985 | Koch | 55/58 X |
| 4,614,525 | 9/1986 | Reiss | 55/25 |
| 4,684,377 | 8/1987 | Haruna et al. | 55/68 X |
| 4,685,939 | 8/1987 | Kratz et al. | 55/25 |
| 4,711,645 | 12/1987 | Kumar | 55/68 X |
| 4,756,723 | 7/1988 | Sircar | 55/25 |
| 4,813,977 | 3/1989 | Schmidt et al. | 55/26 |
| 4,950,312 | 8/1990 | Puppe et al. | 55/68 |

FOREIGN PATENT DOCUMENTS

| | | |
|---|---|---|
| 0170026 | 2/1986 | European Pat. Off. |
| 0237074 | 9/1987 | European Pat. Off. |
| 0158262 | 8/1988 | European Pat. Off. |
| 3424144 | 1/1986 | Fed. Rep. of Germany |
| 3718673 | 12/1988 | Fed. Rep. of Germany |

OTHER PUBLICATIONS

Gas Review Nippon, No. 5, Feb. 1985.
Patent Abstracts of Japan, vol. 11, No. 379, (C-463)(2826), Dec. 10, 1987, and JP-A-62 148304 (Nippon Sanso K.K.), Jul. 2, 1987.

*Primary Examiner*—Robert Spitzer
*Attorney, Agent, or Firm*—Sprung Horn Kramer & Woods

[57] ABSTRACT

A process for oxygen-enrichment of air by means of vacuum swing adsorption (VSA) using Ca zeolite A molecular sieves, the improvement wherein the adsorbers of the VSA units are filled with Ca zeolite A molecular sieves which have different adsorption characteristics.

3 Claims, 2 Drawing Sheets

N₂-O₂-Ar adsorption isotherme
25 C°, Ca-zeolite A

PROCESS FOR THE ADSORPTIVE OXYGEN-ENRICHMENT OF AIR WITH MIXTURES OF CA ZEOLITE A MOLECULAR SIEVES BY MEANS OF VACUUM SWING ADSORPTION

This application is a continuation of application Ser. No. 442,763, filed Nov. 29, 1989, now abandoned.

The present invention relates to an improved process for oxygen-enrichment of air using vacuum swing adsorption.

Direct production of oxygen from air at ambient temperatures is already carried out extensively on an industrial scale using molecular sieves (c.f. e.g. Gas Review Nippon, p. 13, no. 5, 1985). The adsorption of nitrogen in preference to oxygen is utilized in this process (see FIG. 1), i.e. nitrogen from the air is adsorbed, and when the air flows through a bulk of zeolite, the components adsorbed less strongly, such as oxygen and argon, are collected as the product at the discharge of this bulk. The desorption of the adsorbed nitrogen can be effected e.g. by evacuation of the bulk. In this case, this process is called "VSA" (=vacuum swing adsorption), in contrast to "PSA" (=pressure swing adsorption), which is also known. A continuous process is achieved in the VSA process by the following process steps: a) passage of air through a zeolite bulk at e.g. 1 atm; $O_2$-rich gas is removed at the discharge side; b) evacuation of the bulk with a vacuum pump to a reduced pressure of about 100 to 300 mbar in counter-current with the air flow; c) filling of the bulk with $O_2$ product to 1 atm in countercurrent with the air flow.

As a result of these three steps, there are usually three zeolite bulks, i.e. adsorbers, which are operated in cycles.

The profitability of these units is influenced by the investment, such as the amount of adsorbent and the size of the vacuum pump, and in particular by the operating costs, such as the current consumption of the vacuum pump. The aim of any development is therefore optimization between the amount of molecular sieve, the size of the vacuum pump and the energy consumption of the vacuum pump. Development of the molecular sieve has to date progressed in the direction of high adsorption of nitrogen, as a result of which it has automatically been possible to reduce the amount of zeolite.

The object of the present invention was to discover a process of favourable energy. It has now been found that in the case of $O_2$-enrichment of air by means of the VSA process with Ca zeolite A, the energy consumption of the vacuum pump can be reduced if the zeolite bulk of an adsorber consists of separate bulks of two or three molecular sieves of the Ca zeolite A type of different adsorption capacity for nitrogen, the zeolite bulk of lowest nitrogen adsorption being in the air intake side of the adsorber and the zeolite bulk of highest nitrogen adsorption being on the adsorption discharge side.

The present invention thus relates to a process for oxygen-enrichment of air by means of vacuum swing adsorption (VSA) using Ca zeolite A molecular sieves, which is characterized in that the adsorbers of the VSA units are filled with Ca zeolite A molecular sieves which have different adsorption characteristics.

The process according to the invention is on principle carried out like conventional PSA or VSA processes. Relevent processes are described e.g. in EP-A 0 158 268.

The Ca zeolite A molecular sieves used as likewise known materials, which are known e.g. from DE-OS 34 24 144 (=U.S. Ser. No. 746,912) and DE-OS 37 18 673 (=U.S. Ser. No. 192,441).

The filling of the adsorbers can be carried out in any desired manner, and it must merely be ensured that the bottom layer of the adsorber consists of molecular sieve with the lowest adsorption capacity for nitrogen.

Further parameters which are to be maintained as far as possible are the following:

If the nitrogen is adsorbed under increased pressure, desorption of the nitrogen is effected merely by reducing the pressure, e.g. to 1 atm with subsequent desorption by means of a vacuum pump, with or without flushing with oxygen. The temperature of the air to be separated is between $-20°$ C. and $50°$ C., it also being possible for this air to be moist.

In many cases it may be appropriate additionally to employ a layer consisting e.g. of silica gel before the actual adsorption layer in order to dry the stream of gas.

The VSA process according to the invention may be illustrated in more detail in the following examples:

The following data remain constant for all the examples:
- adsorber internal diameter: 550 mm
- adsorber bulk height: 2,500 mm
- medium-pored silica gel at the bottom end, 70 liters per adsorber remaining bulk of Ca zeolite A in granulated form of particle size 2–3 mm, bulk density about 650 g/l.

DETAILED DESCRIPTION OF THE FIGURE

Ambient air is passed via fan G, line L12, and valve 11A into the adsorber A (under 1 bar (abs), 20° C. with 75% rel. humidity). Oxygen-rich gas is removed as the product via valve 14 A, line L13 and fan R (under 1 bar (abs)). The time taken for the air separation is 1 minute. Valves 12A, 13A are closed.

At the same time, adsorber B is evacuated to 150 mbar within one minute via valve 12B, line L11 and a vacuum pump V, valves 11B, 13B, 14B of adsorber B being closed. An oil ring pump which can be adjusted via a gear mechanism is used as the vacuum pump, its delivery always being measured under 1 bar (abs) at 25° C.

At the same time, adsorber C is filled up with product oxygen from 150 mbar to 1 bar (abs) within 1 minute via valve 15, line L14 and valve 13C, valves 11C, 12C, 14C being closed.

EXAMPLE 1 (comparison)

Figure 1:
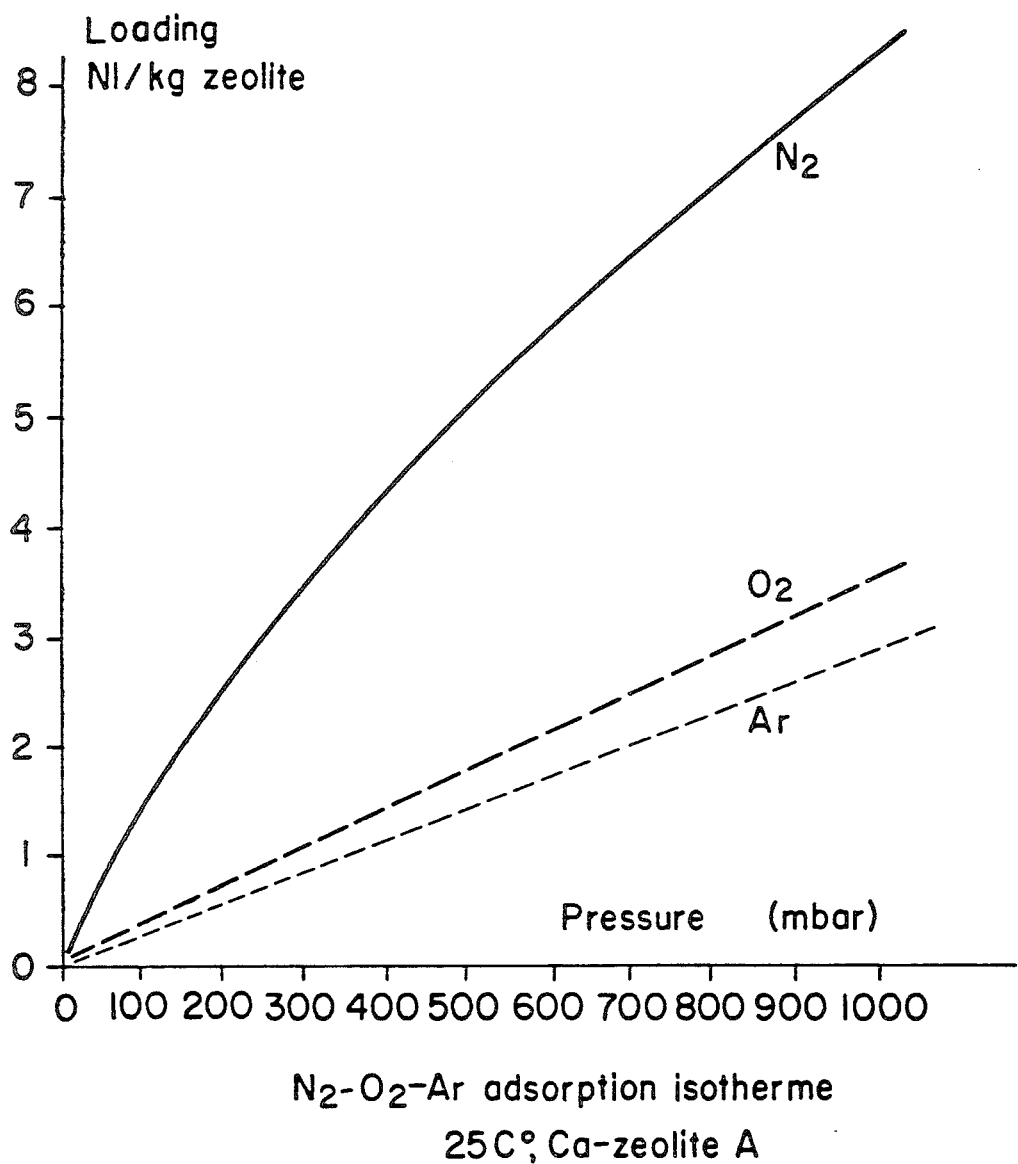
FIG. 1 shows the adsorption of nitrogen in preference to oxygen. The diagram of the unit can be seen from FIG. 2, which also shows the flow of the process.
Figure 2:
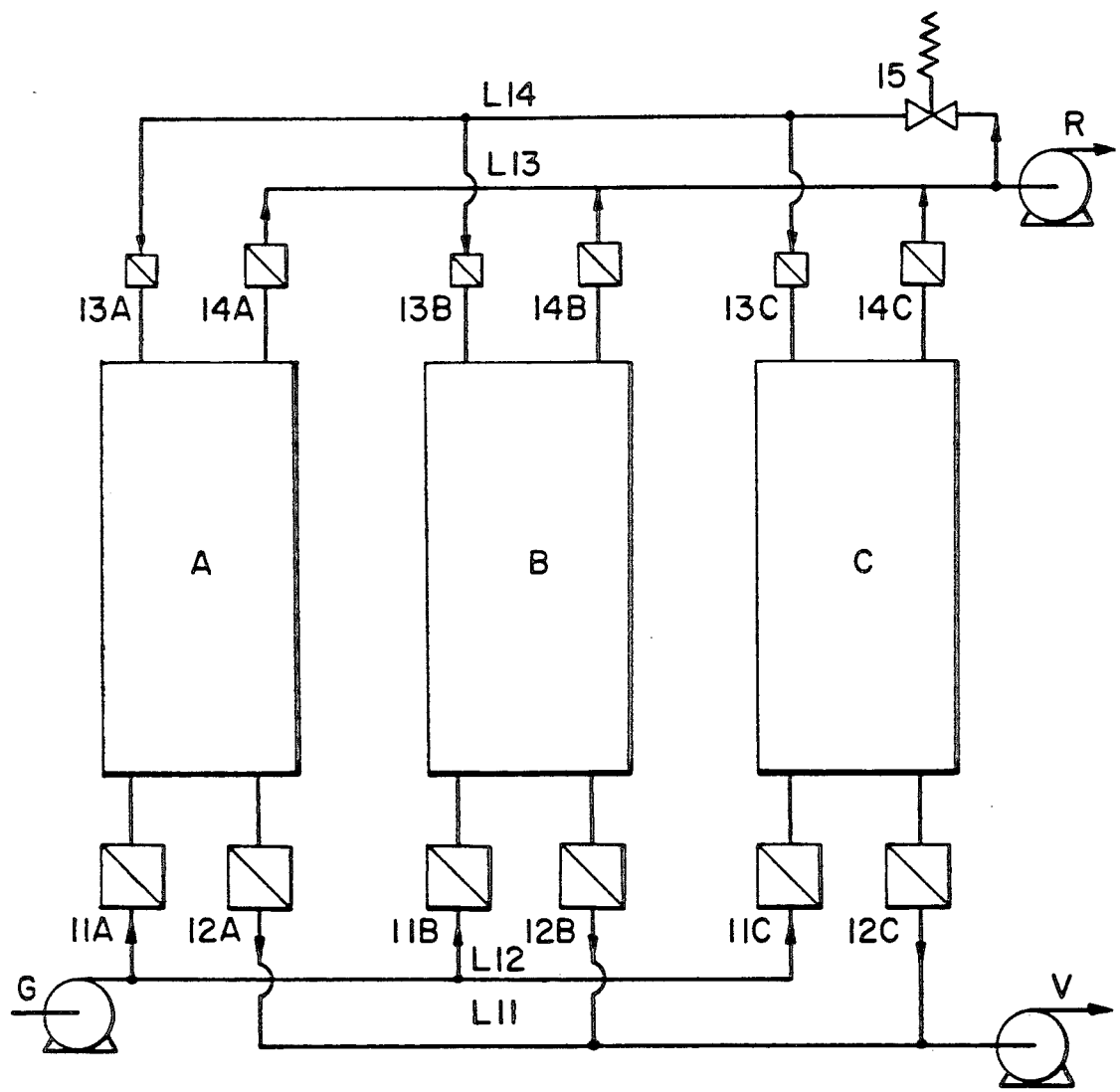

Ca zeolite A granules according to U.S. Pat. No. 3,773,690 example 3) were employed. The $H_2O$ residual loading of the activated zeolite was less than 0.5 wt. % (according to DIN 8948, $P_2O_5$ method) and the nitrogen adsorption was 14 Nl(kg under 1 bar (abs) at 25° C. The amount of zeolite per adsorber was 346 kg. According to the above process, FIG. 2, an amount of $O_2$ product of 20.5 $Nm^3/h$ with an $O_2$ content of 93% was obtained. The vacuum pump had a suction capacity of 546 $m^3/h$, with a current consumption of 11.42 KW. The specific energy consumption was accordingly 0.599 $KWh/Nm^3/O_2$.

EXAMPLE 2 (comparison)

Ca. zeolite granules corresponding to DE-OS 3 424 144 (=U.S. Ser. No. 746,912), example 2) were employed (340 kg/adsorber). The $H_2O$ residual loading of the activated zeolite was less than 0.5 wt. %. The nitrogen loading was 7.5 Nl/kg at 25° C. under 1 bar (abs.) According to the above VSA process, an amount of product of 14.55 $Nm^3$/h (93% $O_2$) was obtained. The vacuum pump had a suction capacity of 450 $m^3$/h with an energy consumption of 9.11 KW. The specific energy consumption was therefore 0.674 $KWh/Nm^3$.

EXAMPLE 3 (according to the invention)

The adsorbers were filled above the silica gel layer with 183 $dm^3$ MS zeolite of example 2 and above this with 341 $dm^3$ MS zeolite of example 1 (35% to 65%). An amount of $O_2$ product of 20.3 $Nm^3$/h (93% $O_2$) was to be obtained. The vacuum pump here had a suction capacity of 517 $m^3$/h and a current consumption of 10.48 KW, i.e. 0.554 $KWh/Nm^3$ $O_2$.

EXAMPLE 4

The adsorbers were filled from three mixtures of Ca zeolite A. The bottom zone consisted of 90 kg zeolite of example 2. On top of this was a layer of 60 kg Ca zeolite A granules prepared in accordance with the patent specification (DE-OS 3 718 673 (=U.S. Ser. No. 192,441), example 1) with a nitrogen adsorption of 12 Nl/kg (1 bar, abs, 25° C.). The top end of the bulk consisted of 195 kg zeolite granules of example 1. An amount of $O_2$ product of 20.13 $Nm^3$/h (93% $O_2$) was produced, the vacuum pump size was 505 $m^3$/h, and the energy consumption was 10.1 KW, i.e. the specific energy requirement was 0.53 $KWh/Nm^3$ $O_2$.

EXAMPLE 5 (comparison)

The zeolite bulk consisted of 224 kg granules of example 1 at the top end of the adsorber and of Na zeolite X (121 kg) according to U.S. Pat. No. 3,773,690, with an $N_2$ adsorption of 6.8 Nl/kg under 1 bar, abs, at 25° C., at the bottom end. The $O_2$ product rate was 16.9 $Nm^3$/h, the pump capacity was 520.5 $m^3$/h and energy consumption of the pump was 10.63 KWh, i.e. the specific output was 0.629 $KWh/Nm^3$.

Examples 3 and 4 show the advantage of mixing Ca zeolite A mixtures of different adsorption capacity for nitrogen, and in contrast example 5 shows that not only the grading of the bulk according to the nitrogen adsorption but also separate mixing of the same zeolite type is of essential importance.

What is claimed is:

1. In a process for oxygen-enrichment of air by means of vacuum swing adsorption (VSA) with adsorbers containing Ca zeolite A molecular sieves, the improvement wherein the adsorbers of the VSA units are filled with separate layers of Ca zeolite A molecular sieves which have different adsorption characteristics.

2. Process according to claim 1, wherein the adsorber has a crude gas intake end, which is a bottom layer of the adsorber, and an $O_2$ product end, which is a top layer of the adsorber, the crude gas intake end consists of Ca zeolite A adsorbent having the lowest adsorption capacity for nitrogen and the $O_2$ product end consists of Ca zeolite A adsorbent having the highest adsorption capacity for nitrogen.

3. Process according to claim 2, wherein a transition of the zeolite qualities from the adsorber crude gas intake end to the adsorber $O_2$ product end is effected virtually smoothly through several layers.

* * * * *